US009773316B2

(12) United States Patent
Lim et al.

(10) Patent No.: US 9,773,316 B2
(45) Date of Patent: Sep. 26, 2017

(54) CAMERA MODULE PROJECTING PATTERNS AND MEASURING DISTANCE USING THE PROJECTED PATTERNS

(71) Applicant: LG INNOTEK CO., LTD., Seoul (KR)

(72) Inventors: Sung Hyun Lim, Seoul (KR); Jung Ah Park, Seoul (KR)

(73) Assignee: LG INNOTEK, CO., LTD., Seoul (KR)

( * ) Notice: Subject to any disclaimer, the term of this patent is extended or adjusted under 35 U.S.C. 154(b) by 258 days.

(21) Appl. No.: 14/408,153

(22) PCT Filed: Jun. 14, 2013

(86) PCT No.: PCT/KR2013/005283
§ 371 (c)(1),
(2) Date: Dec. 15, 2014

(87) PCT Pub. No.: WO2013/187731
PCT Pub. Date: Dec. 19, 2013

(65) Prior Publication Data
US 2015/0193933 A1    Jul. 9, 2015

(30) Foreign Application Priority Data

Jun. 14, 2012 (KR) .................. 10-2012-0063535

(51) Int. Cl.
*H04N 7/18* (2006.01)
*G06T 7/00* (2017.01)
(Continued)

(52) U.S. Cl.
CPC ............ *G06T 7/0044* (2013.01); *G01B 11/25* (2013.01); *G01C 3/08* (2013.01); *G01S 17/46* (2013.01);
(Continued)

(58) Field of Classification Search
USPC ........................................ 348/136
See application file for complete search history.

(56) References Cited

U.S. PATENT DOCUMENTS 4,894,677 A * 1/1990 Bourcier ............... G01S 17/875
348/140
5,748,320 A * 5/1998 Moriya .................. G01B 11/02
250/559.24
(Continued)

FOREIGN PATENT DOCUMENTS

JP       2005-258622 A    9/2005
KR   10-2005-0026949 A    3/2005
KR   10-2012-0009048 A    2/2012

OTHER PUBLICATIONS

International Search Report dated Oct. 24, 2013 issued in Application No. PCT/KR2013/005283.

*Primary Examiner* — Leron Beck
(74) *Attorney, Agent, or Firm* — KED & Associates, LLP

(57) ABSTRACT

Disclosed are a camera module and a method of measuring a distance by using the same. The camera module includes a light source to irradiate a light, a film having a pattern through which the light irradiated by the light source passes, an image sensor to acquire an image of a subject, and a distance estimating module to estimate a distance from the subject by using the image acquired by the image sensor. The acquired image includes a pattern image projected by the light passing through the pattern, and the distance estimating module estimates the distance by using the pattern image.

14 Claims, 2 Drawing Sheets

(51) Int. Cl.
*G01C 3/08* (2006.01)
*G01S 17/46* (2006.01)
*G01B 11/25* (2006.01)
*H04N 5/33* (2006.01)
*G06T 7/73* (2017.01)

(52) U.S. Cl.
CPC ............... *G06T 7/74* (2017.01); *H04N 5/33* (2013.01); *G06T 2207/10048* (2013.01)

(56) References Cited

U.S. PATENT DOCUMENTS

| | | | | |
|---|---|---|---|---|
| 5,838,428 A | * | 11/1998 | Pipitone | G01S 17/89 356/3.09 |
| 5,963,310 A | * | 10/1999 | Brown | G01B 11/162 356/35.5 |
| 6,067,165 A | * | 5/2000 | Matsumiya | G01B 21/042 356/399 |
| 2002/0186221 A1 | * | 12/2002 | Bell | G06F 3/011 345/474 |
| 2007/0064245 A1 | * | 3/2007 | Yoshino | G01B 11/2527 356/603 |
| 2009/0185157 A1 | * | 7/2009 | Imamura | G01C 3/085 356/3.01 |
| 2011/0255770 A1 | * | 10/2011 | Touya | G01N 21/9503 382/144 |
| 2012/0113252 A1 | * | 5/2012 | Yang | G01B 11/026 348/135 |

* cited by examiner

[Fig. 1]
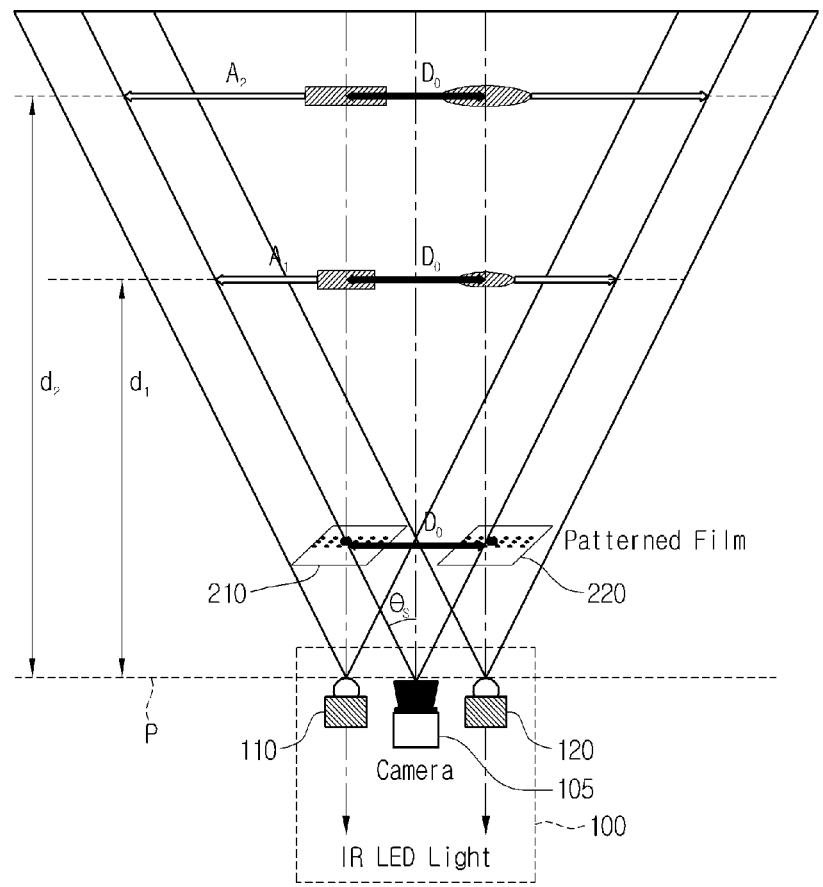
[Fig. 2]
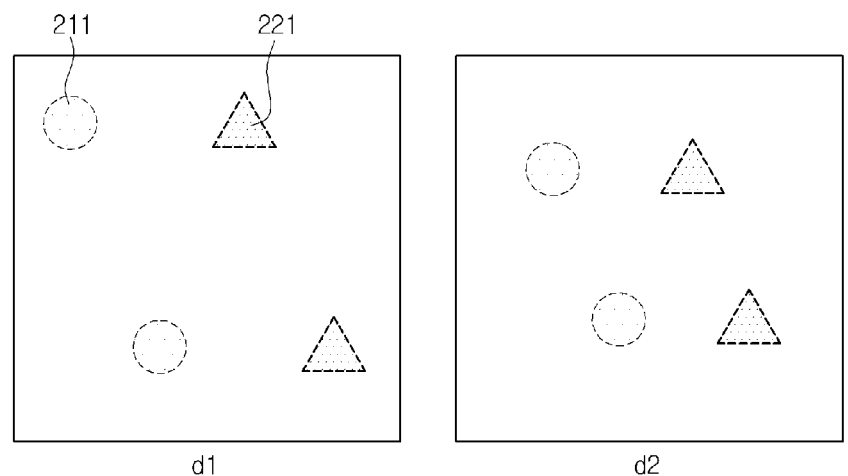

[Fig. 3]
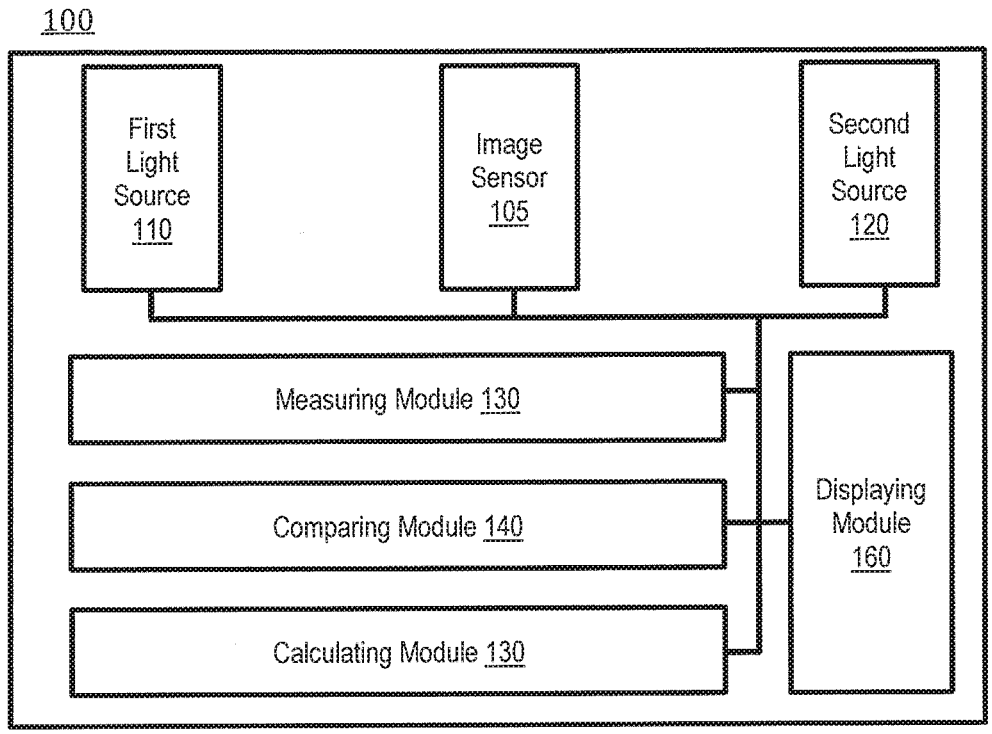
[Fig. 4]
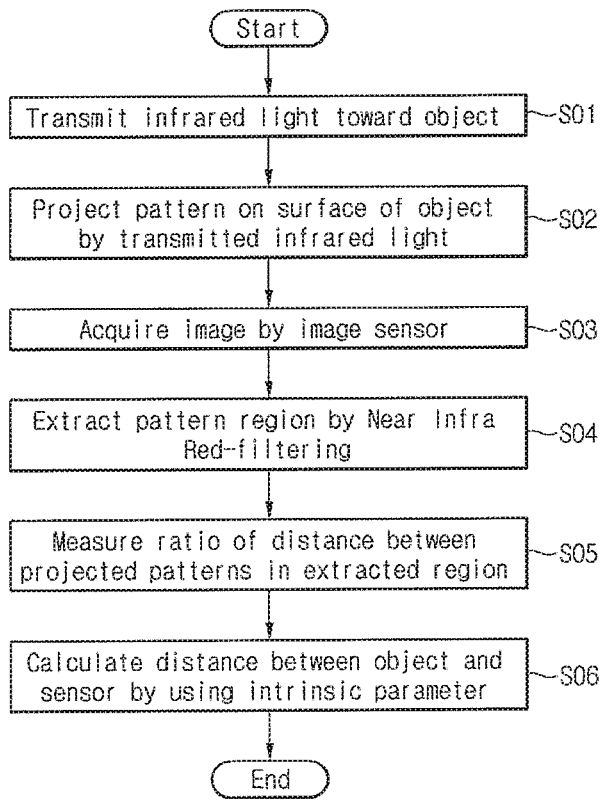

CAMERA MODULE PROJECTING PATTERNS AND MEASURING DISTANCE USING THE PROJECTED PATTERNS

CROSS-REFERENCE TO RELATED PATENT APPLICATIONS

This application is a U.S. National Stage Application under 35 U.S.C. §371 of PCT Application No. PCT/KR2013/005283, filed Jun. 14, 2013, which claims priority to Korean Patent Application No. 10-2012-0063535 filed Jun. 14, 2012, whose entire disclosures are hereby incorporated by reference.

TECHNICAL FIELD

The embodiment relates to a camera module. In particular, the embodiment relates to a camera module and a method of measuring a distance by using the same.

BACKGROUND ART

In general, a distance refers to a length of a straight line linking two points with each other.

In order to measure the distance, after dividing the straight line between two points into several sections, the length of each section is measured by using a scaled ruler or a reference ruler having a predetermined distance and the total lengths of the sections are obtained. The distance is calculated by using the total length.

Further, in addition to the above scheme, there are generally-known various schemes such as a triangulation scheme of directly and mechanically measuring included angles placed at both ends of a scale, which has a predetermined length and placed between two measurement points, by using a theodolite telescope, a scheme of measuring the distance by reading scale intervals between two scribed lines on an image viewed through a telescope, and a scheme of calculating the distance based on the speed and the time of light or an electromagnetic wave.

According to the scheme of measuring the distance between two points using the reference ruler such as the ruler, since a measurer must personally measure the length of each section to calculate the distance, the measurement efficiency and precision may be significantly degraded.

According to the distance measuring scheme based on a telescope, the high cost is required. In addition, since the measurer must read the scale intervals between two scribed lines to calculate the distance, errors may frequently occur when the distance is measured.

DISCLOSURE OF INVENTION

Technical Problem

The embodiment provides a camera module, capable of measuring the distance from an object by using a plurality of infrared light sources and a patterned film provided therein, and a method of measuring a distance by using the same.

Technical objects of the embodiment may not be limited to the above object and other technical objects of the embodiment will be apparent to those skilled in the art from the following description.

Solution to Problem

According to the embodiment, there is provided a camera module including a light source, a film having a pattern through which the light irradiated from a light source passes, an image sensor to acquire an image of a subject, and a distance estimating module to estimate a distance from the subject by using the image acquired by the image sensor. The acquired image includes a pattern image projected by the light passing through the pattern, and the distance estimating module estimates the distance by using the pattern image.

In this case, the light source includes a first light source provided at one side of the image sensor, and a second light source provided at an opposite side of the image sensor. The film includes a first film provided on a moving path of a light irradiated from the first light source and having a first pattern, and a second film provided on a moving path of a light irradiated from the second light source and having a second pattern.

In addition, the image sensor extracts the pattern image projected on the subject from the acquired image of the subject, and the distance estimating module estimates the distance by using the extracted pattern image.

Further, the distance estimating module includes a measuring module to measure a distance between the first and second patterns at the pattern image, a comparing module to compare the measured distance with an intrinsic parameter, and a calculating module to calculate the distance from the subject according to a comparison result of the comparing module.

In addition, the camera module further includes a displaying module to display information of the distance from the subject, which is calculated by the calculating module.

In addition, the light source includes an infrared LED, and the image sensor includes an infrared filter.

Further, the first and second patterns formed at the first and second films, respectively, have shapes different from each other.

Meanwhile, according to the embodiment, there is provided a method of measuring a distance of a camera module. The method includes projecting a pattern image on a subject by irradiating a plurality of lights, which pass through a plurality of patterns, respectively, onto the subject, acquiring an image of the subject, and estimating a distance from the subject by using the pattern image constituting the acquired image.

Further, the method further includes extracting the pattern image from the acquired image.

Further, the estimating of the distance from the subject includes determining distances among the patterns contained in the extracted pattern image, comparing the determined distances with an intrinsic parameter, and estimating the distance from the subject according to a comparison result.

In addition, the intrinsic parameter comprises information of the distances among the patterns varied depending on the distance from the subject.

Advantageous Effects of Invention

As described above, according to the camera module and the method of measuring the distance by using the same according to the present embodiment, the device, which measures the distance between the object and the sensor by calculating the variation in the distance between patterns projected on the object, thereby not only reducing the time required to measure the distance, but also measuring the distance at low cost, can be provided.

BRIEF DESCRIPTION OF DRAWINGS

FIG. 1 is a schematic view showing the operation of a camera module according to the embodiment.

FIG. 2 is a view showing the distance between patterns projected on an object in the camera module according to the embodiment.

FIG. 3 is a block diagram showing the camera module according to the embodiment.

FIG. 4 is a flowchart showing a method of measuring a distance of a camera module step by step according to the embodiment.

BEST MODE FOR CARRYING OUT THE INVENTION

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

Hereinafter, an exemplary embodiment will be described with reference to accompanying drawings. The details of other embodiments are described in the detailed description and shown in the accompanying drawings. The advantages, the features, and schemes of achieving the advantages and features of the embodiment will be apparently comprehended by those skilled in the art based on the embodiments, which are detailed later in detail, together with accompanying drawings. The same reference numerals will be assigned to the same elements throughout the whole description.

FIG. 1 is a schematic view to explain the operation of a camera module according to an embodiment.

FIG. 2 is a view showing the variation in the distance between projected patterns depending on the distance of an object from a camera module shown in FIG. 1.

Referring to FIG. 1, a camera module 100 includes an image sensor 105, a first light source 110, a second light source 120, a first film 210, and a second film 220.

As shown in drawings. The image sensor 105 is provided at the center of the camera module 100. In addition, the first and second light sources 110 and 120 may be provided at both sides of the image sensor 105 to generate lights.

In other words, the first light source 110 may be provided at the left side of the image sensor 105, and the second light source 120 may be provided at the right side of the image sensor 105.

In this case, the first light source 110 and the second light source 120 are infrared light sources to generate infrared lights.

In this case, although drawings show that the first and second light sources 110 and 120 are provided at both sides of the image sensor 105, respectively, according to the embodiment, the arrangement positions of the first and second light sources 110 and 120 and the number of the first and second light sources 110 and 120 are not limited. In other words, according to the embodiment, the arrangement positions of the first and second light sources 110 and 120 may be changed to upper and lower sides of the image sensor 105, respectively, and the number of the first and second light sources 110 and 120 may be increased to three or four.

As shown in FIG. 1, an image region of the camera module 100 may be set by an angle of $\theta_s$ about the central axis of the image sensor 105.

The image region refers to an image region of an object, which may be acquired by the image sensor 105.

In this case, a horizontal area of an image input to the image sensor 105 is increased as the distance is increased.

In other words, the image region is more widely represented with respect to an object located at a farther distance than an object located at a nearer distance.

In this case, a first light emitted from the first light source 110 passes through a first film 210 having a first pattern.

In addition, a second light emitted from the second light source 120 passes through a second film 220 having a second pattern.

In this case, although the drawings show that the first and second films 210 and 220 are separated from the camera module 100 for the convenience of explanation, the first and second films 210 and 220 are attached to the camera module 100 corresponding to positions in which the first and second light sources 110 and 120 are provided.

Therefore, the first light emitted from the first light source 110 passes through the first film 210 having the first pattern. In addition, the second light emitted from the second light source 120 passes through the second film 220 having the second pattern.

In this case, the first and second patterns may be formed with different shapes at the first and second films 210 and 220, respectively.

The first and second patterns may have various shapes such as a circular shape, a triangle shape, a rectangular shape, and a diamond shape, but the embodiment is not limited thereto. The first and second patterns may be realized in various shapes sufficient to distinguish between the first and second patterns.

For example, as shown in the drawings, the first pattern formed at the first film 210 corresponding to the first light source 110 may have a rectangular shape.

In addition, the second pattern formed at the second film 220 corresponding to the second light source 120 may have a circular shape.

Meanwhile, the distance between the first and second films 110 and 220 having the first and second patterns is $D_0$.

Accordingly, the distance between the first and second films 110 and 220 having the first and second patterns may be represented as $D_0$ even if the first and second films 110 and 220 are at distances of $d_1$ and $d_2$ from the camera module 100.

The image sensor 105 may collect the image information existing within image ranges formed by straight lines having the angle of up to $\theta_s$ about the central axis.

Meanwhile, the maximum horizontal distances from the central axis of the image sensor 105 to the straight line having the angle of up to $\theta_s$ about the central axis of the image sensor 105 are set to $A_1$ and $A_2$ at the distances of $d_1$ and $d_2$, respectively.

In this case, following Equation 1 is established between the distances $A_1$ and $d_1$, and between $A_2$ and $d_2$.

$$A_1 = d_1 * \tan \theta_s, \text{ and}$$

$$A_2 = d_2 * \tan \theta_s. \qquad \text{Equation 1}$$

In this case, $D_0/A_i$, which is a pixel distance of a pattern, satisfies following equation 2 at the distances of $d_1$ and $d_2$.

$$D_0/A_1 = D_0/d_1 \tan \theta_s, \text{ and}$$

$$D_0/A_2 = D_0/d_2 \tan \theta_s. \qquad \text{Equation 2}$$

If the relationship between a pixel size and the distance is calculated based on the above equations, following equation 3 is established.

$$Do/A1 : Do/A2 = 1/d1 : 1/d2 \qquad \text{Equation 3}$$

The $d_i$, which is the distance to the straight line from the camera module 100, may be found based on the above equation.

$$d1 = Do/(r_P * \tan \theta_s), (r_P \text{ is } D_0/A_P). \qquad \text{Equation 4}$$

Through the above equation, the value of $D_0$ is maintained as a constant if the distance between the first light source 110 and the second light source 120, or the distance between the first film 210 and the second film 220 is not varied.

In other words, the value of $D_0$ is not varied depending on $d_i$. Similarly, the value of $\tan_s$ is not varied depending on the $d_i$. Accordingly, the value of the $d_i$ is set by the ratio of $D_0/A_P$.

As shown in drawings, as the distance between the object and the image sensor 105 is increased, the value of $A_P$ is increased, and the value of $D_0/A_P$ is decreased. This is shown in FIG. 2.

FIG. 2 shows the variation state between first and second patterns 211 and 221 according to distances from the object.

The distance between the first and second patterns 211 and 221 is always maintained at the same value. In other words, the distance between the first and second patterns 211 and 221 formed at the first and second films 210 and 220 is constant.

However, as the distance between the image sensor 105 and the object is increased, the image sensor 105 collects image information at a wider image region. Accordingly, the relative ratio of the distance $D_0$ between the first and second patterns 211 and 221 is reduced. In other words, the value of $d_i$ may be calculated by the ratio of $D_0/A_P$.

Accordingly, the distance between the first and second patterns 211 and 221 projected on an object located at the distance of $d_1$ from the camera module 100 may be A, and the distance between the first and second patterns 211 and 221 projected on an object located at the distance of $d_2$ from the camera module 100 may be B shorter than the A.

Therefore, the distance between the first and second patterns 211 and 221 is varied depending on the distance between the camera module 100 and the object.

Accordingly, if distance values between the first and second patterns 211 and 221 depending on distances are stored in the form of a table, the distance between the camera module 100 and the object can be found depending on the distance between the first and second patterns 211 and 221.

FIG. 3 is a block diagram showing the camera module 100 according to the embodiment.

The camera module 100 serving as an apparatus for measuring a distance according to the embodiment includes a film having a pattern. In this case, the film may include the first film 210 having the first pattern and the second film 220 having the second pattern.

In addition, the first film 210 is provided corresponding to the position in which the first light source 110 is provided, and the second film 220 is provided corresponding to the position in which the second light source 120 is provided.

In addition, the camera module 100 includes the image sensor 105, the first and light sources 110 and 120, a measuring module 130, a comparing module 140, a calculating module 150, and a displaying module 160.

The first and light sources 110 and 120 may be spaced apart from each other by a constant distance, and may be realized by using LEDs.

After the first light generated from the first light source 110 has passed through the first pattern formed at the first film 210, the first light is projected on the object.

Similarly, after the second light generated from the second light source 120 has passed through the second pattern formed at the second film 220, the second light is projected on the object.

The image sensor 105 may include an infrared filter. The image sensor 105 may collect information of the light source, which is projected on the surface of the object by the filter.

The image sensor 105 acquires the image of the object. In this case, the image acquired through the image sensor 105 includes lights (preferably, patterns) projected on the object through the first and second light sources 110 and 120.

In addition, the image sensor 105 separately extracts only pattern images from the acquired image. In this case, the pattern image extracting process may be performed through a Near Infra Red-Filtering scheme.

The measuring module 130 receives the image acquired through the image sensor 105.

In addition, the measuring module 130 measures the distance between the first and second patterns based on the extracted pattern images. Preferably, the measuring module 130 measures the horizontal-plane length between the first and second patterns when viewed on a horizontal plane.

The comparing module 140 compares the horizontal-plane length measured by the measuring module 130 with an intrinsic parameter which is previously stored.

The intrinsic parameter includes the distance values between the first and second patterns 211 and 221 varied depending on the distances between the object and the camera module 100.

After comparing the horizontal-plane length measured by the measuring module 130 with the intrinsic parameter which is previously stored, the comparing module 140 outputs a result value according to the comparison result.

The calculating module 150 calculates the distance between the camera module 100 and the object by using the result value output from the comparing module 140.

The displaying module 160 displays distance data calculated by the calculating module 150.

FIG. 4 is a flowchart showing a method of measuring a distance of the camera module step by step according to the embodiment.

Referring to FIG. 4, a light is transmitted toward the object (step S01). The light includes a plurality of infrared lights. In addition, the infrared lights pass through the first film 210 having the first pattern and the second film 220 having the second pattern.

Next, patterns are projected on the surface of the object by the transmitted light (step S02).

In other words, the first pattern formed at the first film 210 and the second pattern formed at the second film 220 are projected on the object.

Thereafter, an image including the patterns projected on the object is acquired by the image sensor 105 (step S03).

In this case, the image includes a real image of the object and pattern images projected by the light and the film. In addition, the pattern images include first and second pattern images.

Next, pattern regions are extracted from the image, which is input to the image sensor 105, through a filter (step S04).

Thereafter, the ratio of the distance between the first and second patterns, which are projected, to the maximum horizontal distance input into the image sensor from the same distance, in the pattern region extracted through the above step is measured (step S05).

Thereafter, the distance between the object and the image sensor is calculated by using the intrinsic parameter (step S06).

Any reference in this specification to one embodiment, an embodiment, example embodiment, etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

The invention claimed is:

1. A camera module comprising:
light sources to output light toward a subject;
films through which the light outputted by the light sources passes; and
an image sensor to acquire an image of the subject,
wherein the light sources comprises a first light source and a second light source,
wherein the films comprises a first film provided in a path of first light outputted from the first light source and having a first pattern, and a second film provided in a path of second light outputted from the second light source and having a second pattern,
wherein the acquired image comprises a pattern image having a first pattern image projected by the first light passing through the first pattern, and a second pattern image projected by the second light passing through the second pattern,
wherein the image sensor extracts the pattern image from the acquired image of the subject, and
wherein the camera module is configured to estimate a distance from the subject to the camera using the pattern image, wherein the camera module, when estimating the distance is configured to:
measure a distance between the first pattern image and the second pattern image on the captured image; and
estimate the distance from the subject based on comparing the distance between the first pattern image and second pattern image on the extracted pattern image with a distance between the first film and the second film.

2. The camera module of claim 1, wherein the first light source is provided at one side of the image sensor, and the second light source is provided at an opposite side of the image sensor.

3. The camera module of claim 1, wherein the camera module is further configured to display information identifying the distance from the subject.

4. The camera module of claim 1, wherein at least one of the first light source or the second light source comprises an infrared light emitting diode (LED), and the image sensor comprises an infrared filter.

5. The camera module of claim 1, wherein the first pattern in the first film has a shape different from a shape of second pattern in the second film.

6. A method of measuring a distance from a subject to a camera module, the method comprising:
projecting, by the camera module, a pattern image on the subject by irradiating a plurality of light sources to generate lights, which pass through a plurality of patterns, which are different each other onto the subject, wherein the pattern image includes a first pattern image generated by a first pattern of the plurality of patterns, and a second pattern image generated by a second pattern of the plurality of patterns;
acquiring, by the camera module, an image of the subject;
extracting, by the camera module, the pattern image from the acquired image; and
estimating, by the camera module, the distance from the subject using the pattern image, wherein the estimating of the distance from the subject includes:
determining a distance between the first pattern image and the second pattern image in the acquired image;
comparing the determined distance between the first pattern image and the second pattern image with a distance between the first pattern and the second pattern to form a comparison result; and
estimating the distance from the subject based on the comparison result.

7. The camera module of claim 1, wherein the image sensor extracts the pattern image through a Near Infra Red-Filtering scheme.

8. The camera module of claim 1, wherein each of the first pattern and the second patterns includes one or more of a circular shape, a triangle shape, a rectangular shape, or a diamond shape.

9. The camera module of claim 1, wherein the camera module, when measuring a distance between the first pattern image and the second pattern image on the captured image, is further configured to:
determine a quantity of pixels, in the captured image, between the first pattern image and the second pattern image; and
determine the distance between the first pattern image and the second pattern image based on the quantity of pixels between the first pattern image and the second pattern image and a size of the pixels.

10. The method of claim 6, wherein the pattern image is extracted through a Near Infra Red-Filtering scheme.

11. The method of claim 6, wherein the plurality of light sources includes a first light source that illuminates the first pattern and a second light source that illuminates the second pattern.

12. The method of claim 11, wherein the first pattern is included in a first film receiving light from the first light source, the second pattern is included in a second film receiving light from the second light source, and the distance between the first pattern and the second pattern corresponds to a distance between the first film and the second film.

13. The method of claim 6, wherein each of the first pattern and the second patterns includes one or more of a circular shape, a triangle shape, a rectangular shape, or a diamond shape.

14. The method of claim 6, wherein measuring the distance between the first pattern image and the second pattern image further includes:

calculating a quantity of pixels, in the captured image, between the first pattern image and the second pattern image;

identifying a size of the pixels in the captured image; and determining the distance between the first pattern image and the second pattern image based on the quantity of pixels between the first pattern image and the second pattern image and the size of the pixels.

* * * * *